United States Patent Office 3,131,026
Patented Apr. 28, 1964

3,131,026
PURIFICATION OF ZINC SULFIDE POWDER
Edward Carnall, Jr., and LeRoy S. Ladd, Rochester, N.Y., assignors to Eastman Kodak Company, Rochester, N.Y., a corporation of New Jersey
No Drawing. Filed Sept. 14, 1961, Ser. No. 137,974
6 Claims. (Cl. 23—135)

This invention relates to a method for the purification of zinc sulfide powder in order to provide a zinc sulfide powder which is particularly adaptable for hot pressing into shaped polycrystalline windows at a high temperature and in a vacuum as described in the copending U.S. patent application Serial No. 849,606, filed October 29, 1959, by Carnall et al., entitled "Zinc Sulfide Optical Element and Apparatus and Method for Making Same." Such polycrystalline elements are good infrared transmitters and it is desirable that they are free from absorption bands due to impurities present in the powder. Also the powder should be free from volatile impurities which may cause healed cracks to occur in the polycrystalline element.

Zinc sulfide as prepared by the acid process contains free sulfur and sulfate ions as impurities and these should be removed as completely as possible.

It has been found that free sulfur reduces the near infrared transmission in 0.4 to 2.0 microns wavelength region. Further, it is noted that the free sulfur can cause cracks to form in the pressed polycrystalline element when the sulfur tries to escape during the hot-pressing operation. The cracks flow together or heal when the pressure is continued, but the crack patterns still can be seen in the finished pressing.

Sulfate ion in hot pressed zinc sulfide causes an absorption band to occur at about 8.8 microns. When present in significant concentrations, this band is broad enough to obscure a large portion of the atmosphere window in the 8 to 14 micron region. The purification procedure described herein does much to reduce the sulfate band in polycrystalline elements made as described in the above-mentioned application Serial No. 849,606.

Many zinc sulfide powders purchased commercially have been packaged in polyethylene bags. If such powders are heated directly as in a hot-pressing operation, to above 400° C., in a neutral or reducing atmosphere, they will turn dark and the resulting pressing made from this powder will appear black when viewed by reflected light. This blackening is believed to be due to the decomposition of some organic material which the zinc sulfide has absorbed. The organic material is believed to be a mold release compound which is on the polyethylene.

An object, therefore, of the present invention is to provide zinc sulfide powder which will be suitable for hot pressing into polycrystalline windows, lenses and the like, which will be free from volatile impurities such as sulfur, which will be free from organic matter and which will have reduced sulfate concentration.

In accordance with the present invention, these and other objects are attained by heating zinc sulfide powder containing removable impurities such as free sulfur, organic matter and sulfate ions first in air to such a temperature that the carbonaceous material will oxidize and be expelled but below the temperature at which the zinc sulfide will appreciably oxidize. This oxidation treatment is followed by heating the zinc sulfide powder under a flow of hydrogen sulfide at a temperature at or slightly above the boiling point of free sulfur. The zinc sulfide is then heated under a flow of hydrogen. Both the treatment with hydrogen sulfide and hydrogen will serve to reduce any sulfate which is absorbed on the surface of the sulfide crystals. The treatment with hydrogen also removes excess sulfur. For use in hot-pressing operations, any large flake aggregates in the powder should be removed. This may be done by sieving the powder either before or after treatment through at least 250 mesh screen.

The invention will be further understood by reference to the following examples:

Example 1

Zinc sulfide powder was placed in an open heat-resisting boat made of quartz or Pyrex glass which is placed in a heat-resisting glass tube. The tube containing the boat was placed in a suitable tube furnace of a size such that the boat was entirely within the furnace. One end of the tube was adapted so that combustible gas could be burned off and the other end was sealed with a rubber stopper fed with a glass tube through which the various gases employed in the purification operation may be introduced into the tube. A flow of air is conducted into the tube and the temperature of the boat raised to 460° C.±10° C. and held at this temperature for two hours. At this time, the air is replaced with an inert gas (argon) to purge the tube of oxygen. Then the argon is replaced with purified hydrogen sulfide and heating continued for two additional hours at 480° C.±20° C. At the end of this period, the hydrogen sulfide is replaced with hydrogen and the temperature held for two additional hours at 500° C.±20° C. The furnace is then cooled down to room temperature (20° C.) while continuing a flow of hydrogen over the zinc sulfide powder. The cooled zinc sulfide powder is then sieved through a −250 mesh per inch screen and stored in glass bottles until ready for use in the hot pressing method described in the above-mentioned application Serial No. 849,606.

Example 2

Using the equipment described in Example 1, zinc sulfide powder was purified by the following step: heating the powder in air at 460° C. for two hours followed by heating in argon for two hours at 460° C. and then by heating in hydrogen for two hours at 480° C., then cooling to room temperature while continuing the flow of hydrogen.

Example 3

Zinc sulfide powder was purified by the following steps employing the apparatus described in Ex. 1: heating the powder in air at 460° C. for two hours followed by heating in hydrogen sulfide for two hours at 460° C. and then cooling to room temperature while continuing the flow of hydrogen sulfide.

Example 4

Zinc sulfide powder employing the apparatus described in Example 1 was also purified by the following steps: heating the powder in air at 460° C. for two hours followed by heating in hydrogen for two hours at 460° C. and then cooling to room temperature while continuing the hydrogen flow through the apparatus.

Example 5

Zinc sulfide powder was purified using the apparatus described Ex. 1 by heating in air for two hours at 460° C. followed by heating in hydrogen for two hourse at 460° C., followed by heating in hydrogen sulfide for two hours at 460° C. and then cooling to room temperature while continuing the flow of hydrogen sulfide through the apparatus.

It is found that the first step, i.e. the oxidation step, should be carried out for 1–2 hours at a temperature within the range of 370–480° C. Below this range, the organic material will not oxidize readily and much above this range, the zinc sulfide powder begins to oxidize.

The time of treatment is not too critical, but should be sufficiently long as to oxidize all the organic matter.

The treatment with hydrogen sulfide is best carried out at 460–500° C. for about two hours. This temperature was chosen to be slightly above the boiling point of the elemental sulfur. Higher temperatures up to 650° C. may be used, but the length of time must be decreased to about one-half hour. Prolonged heating at higher temperatures results in a decrease in the transmittance at short wavelengths in a hot pressed polycrystalline window made from the powder. The time required in the temperature range of 460–500° C. need only be long enough to insure complete removal of the free sulfur. A too prolonged treatment appears to result in decreased transmittance in the hot pressed window probably because of the zinc sulfide taking up an excess of sulfur. However, this excess can be removed during subsequent hydrogen treatment.

The treatment with hydrogen can be carried out at 460–500° C. for 1–3 hours. This treatment can be carried out for shorter times and higher temperatures, but prolonged times or temperatures above 650° C. result in a decrease in short wavelengths for a hot pressed optical unit.

Many variations are possible in the above procedure. The first step or oxidation procedure is required only if the zinc sulfide powder contains organic material which will cause darkening of the powder when subsequently heated in neutral or reducing atmospheres. Either air or oxygen can be used. The hydrogen sulfide treatment may be replaced by a similar treatment using an insert gas such as argon or helium or this entire step may be omitted and the oxidation step, if required, followed by only the hydrogen treatment. Further, the treatment with hydrogen sulfide or argon may be carried out and the hydrogen treatment omitted, or still further, the hydrogen and hydrogen sulfide steps may be carried out together by passing both gases over the zinc sulfide powder together. It is also possible to carry out the hydrogen treatment prior to treatment with hydrogen sulfide, and further the hydrogen and/or hydrogen sulfide may be diluted with any inert gases. However, the preferred order of gases is air or oxygen, hydrogen sulfide, then hydrogen.

The following table illustrates how the various treatments alter the transmittance of a hot pressed optical unit prepared under identical pressing conditions.

| Treatment of the Powder | Percent Transmittance at— | | | | | Sample Thickness, mm. |
|---|---|---|---|---|---|---|
| | 1.18 Microns | 1.6 Microns | 2.0 Microns | 3.0 Microns | 8.8 Microns | |
| As received | 50 | 60 | 64 | 67 | 6 | 2.08 |
| Argon, 2 hrs. at 460° C | 55 | 64 | 67 | 68 | 5 | 2.25 |
| H₂S, 2 hrs. at 460° C | 55 | 65 | 68 | 69 | 37 | 2.23 |
| H₂, 2 hrs. at 460° C | 59 | 66 | 69 | 70 | 59 | 2.25 |
| H₂S, 2 hrs. at 460° C.+H₂, 2 hrs. at 460° C | 65 | 68 | 69 | 70 | 69 | 2.39 |

We claim:

1. A method of purifying zinc sulfide powder to improve the transparency of articles hot pressed therefrom comprising subjecting the zinc sulfide powder to an oxidizing atmosphere at a temperature within the range between 370–480° C., thereafter heating the zinc sulfide powder at a temperature between 460–650° C. while passing hydrogen sulfide over the powder, and finally maintaining the zinc sulfide powder within the same temperature range of 460–650° C. in the presence of hydrogen.

2. A method as set forth in claim 1 in which the hydrogen sulfide and hydrogen are concurrently passed over the zinc sulfide powder at a temperature within the range of 460–650° C.

3. A method of purifying zinc sulfide powder to improve the transparency of articles hot pressed therefrom comprising subjecting the zinc sulfide powder to an atmosphere containing oxygen at a temperature between 370–480° C., thereafter heating the zinc sulfide powder at a temperature between 460–500° C. while passing hydrogen sulfide over the powder, and finally maintaining the zinc sulfide powder within the same temperature range of 460–500° C. in the presence of hydrogen.

4. A method of purifying zinc sulfide powder to improve the transparency of articles hot pressed therefrom comprising subjecting zinc sulfide powder to an atmosphere containing oxygen at a temperature between 370–480° C. until all organic matter in the zinc sulfide powder is oxidized, thereafter heating the zinc sulfide powder at a temperature between 460–500° C. for not more than two hours while passing hydrogen sulfide over the powder, and finally maintaining the zinc sulfide powder within the same temperature range of 460–500° C. in the presence of hydrogen for not more than three hours.

5. A method of purifying zinc sulfide powder to improve the transparency of articles hot pressed therefrom comprising subjecting zinc sulfide to an atmosphere containing oxygen at a temperature between 370–480° C., purging the oxygen containing atmosphere from the zinc sulfide powder with an inert gas, heating the zinc sulfide powder at a temperature between 460–650° C. while passing hydrogen sulfide over the powder, and finally maintaining the zinc sulfide powder within the same temperature range of 460–650° C. in the presence of hydrogen.

6. A method of purifying zinc sulfide powder to improve the transparency of articles hot pressed therefrom comprising heating the zinc sulfide powder in the presence of oxygen for approximately two hours at a temperature between 370–480° C., continuing the heating within a temperature range of 460–500° C. for approximately two hours while passing hydrogen over the zinc sulfide powder and then cooling the zinc sulfide to room temperature while continuing the flow of hydrogen.

References Cited in the file of this patent

UNITED STATES PATENTS 2,844,493   Schlosser _____ July 22, 1958

OTHER REFERENCES

Addamiano: Article in Nature, vol. 179 (1957), pp. 493–494.